(12) United States Patent
Reeves et al.

(10) Patent No.: US 8,917,620 B1
(45) Date of Patent: Dec. 23, 2014

(54) SYSTEMS AND METHODS FOR SHARING OF PERFORMANCE-METRIC DATA AMONG SIMILARLY CONFIGURED WIRELESS COMMUNICATION DEVICES

(71) Applicant: Sprint Spectrum L.P., Overland Park, KS (US)

(72) Inventors: Raymond E. Reeves, Oviedo, FL (US); Simon Youngs, Overland Park, KS (US); Mark Peden, Olathe, KS (US); Gary Koller, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 147 days.

(21) Appl. No.: 13/678,177

(22) Filed: Nov. 15, 2012

(51) Int. Cl.
*H04W 24/10* (2009.01)
*H04L 12/26* (2006.01)
*H04W 4/00* (2009.01)

(52) U.S. Cl.
CPC ............... *H04W 24/10* (2013.01); *H04W 4/00* (2013.01)
USPC .......... 370/252; 370/236; 370/328; 455/41.2; 455/67.11; 709/224; 709/227

(58) Field of Classification Search
None
See application file for complete search history.

(56) References Cited

U.S. PATENT DOCUMENTS

| | | | |
|---|---|---|---|
| 7,408,911 B2 * | 8/2008 | Joshi | 370/338 |
| 7,787,820 B2 * | 8/2010 | Hillyard | 455/41.1 |
| 7,796,520 B2 * | 9/2010 | Poustchi et al. | 370/236 |
| 7,970,350 B2 * | 6/2011 | Sheynman et al. | 455/41.1 |
| 8,305,972 B2 * | 11/2012 | Baker et al. | 370/329 |
| 8,364,758 B2 * | 1/2013 | Hydrie et al. | 709/204 |
| 2004/0203435 A1 * | 10/2004 | Karlquist et al. | 455/67.11 |
| 2007/0230392 A1 * | 10/2007 | Adams et al. | 370/318 |
| 2007/0268872 A1 * | 11/2007 | Cromer et al. | 370/338 |
| 2009/0017761 A1 * | 1/2009 | Li et al. | 455/63.1 |
| 2011/0087768 A1 * | 4/2011 | Wu et al. | 709/224 |
| 2013/0309971 A1 * | 11/2013 | Kiukkonen et al. | 455/41.2 |

* cited by examiner

*Primary Examiner* — Candal Elpenord

(57) ABSTRACT

Presently disclosed are systems and methods for wireless communication devices (WCDs) to share relevant performance-metric data with nearby devices having similar configurations. One embodiment takes the form of a method carried out by a WCD. The method includes receiving into a first WCD from a second WCD, via a direct wireless link between the WCDs, data indicating a configuration of the second WCD. The method also includes making a determination as to whether the configuration of the second WCD is at least threshold similar to the configuration of the first WCD and, if so, sharing with the second WCD, via the direct wireless link, performance-metric data for the wireless communication network.

17 Claims, 3 Drawing Sheets

SYSTEMS AND METHODS FOR SHARING OF PERFORMANCE-METRIC DATA AMONG SIMILARLY CONFIGURED WIRELESS COMMUNICATION DEVICES

BACKGROUND

The use of wireless communication devices (WCDs) is becoming increasingly prevalent and popular in modern life. To provide cellular wireless communication service to WCDs, a wireless service provider typically operates a radio access network (RAN) that defines coverage areas (such as cells and/or sectors) in which subscribers' WCDs can be served by the RAN and obtain connectivity to other networks such as the public switched telephone network (PSTN) and the Internet.

A typical RAN includes one or more base transceiver stations (BTSs), each of which may radiate to define one or more coverage areas in which these WCDs can operate. Further, the RAN may include one or more base station controllers (BSCs) or the like, which may be integrated with or otherwise in communication with the BTSs, and which may include or be in communication with one or more switches and/or gateways that provide connectivity with one or more transport networks. Conveniently, with this arrangement, a WCD positioned within the coverage of the RAN can communicate with a BTS and in turn with other served devices and/or with other entities via the one or more transport networks.

In each coverage area, a RAN will typically broadcast (via, e.g., a BTS) a pilot signal that notifies WCDs of the coverage area. In operation, when a WCD detects a pilot signal of sufficient strength, it may transmit a registration message to the RAN to notify the RAN that the WCD is in the coverage area and is requesting service from the RAN via the BTS. If the request is granted, the WCD may then operate in the coverage area in what is typically known as "idle" mode, where the WCD is not actively engaged in a call or other traffic (e.g., packet-data) communication, but does regularly monitor overhead signals in the coverage area to obtain system information and page messages, as examples.

OVERVIEW

Advances in both the software and hardware contained in and utilized by WCDs has allowed for significant growth in the capabilities of these devices. As the level of technological sophistication of WCDs grows, the number of software and hardware modules present in these devices also increases. However, as the number of software and hardware modules increases, the number of potential problems that can arise with the WCDs also increases.

As an example, software and hardware modules may experience problems connecting with a wireless communication network, causing the modules to run slowly and frustrating the user. Additionally, when software and hardware modules experience problems such as connecting with the wireless communication network, the WCD can experience a more rapid battery drain. Other potential problems with the software and hardware are possible as well.

Disclosed are systems and methods for WCDs to share relevant performance-metric data with nearby devices having similar configurations. The sharing of relevant performance-metric data between WCDs may enhance user experiences by proactively avoiding performance problems.

One embodiment takes the form of a method carried out by a first WCD having a first configuration. The method includes receiving into the first WCD from a second WCD, via a direct wireless link between the first WCD and the second WCD, data indicating a second configuration of the second WCD. The method also includes making a determination as to whether the second configuration is at least threshold similar to the first configuration. The method then includes the first WCD sharing with the second WCD, via the direct wireless link, performance-metric data for a wireless communication network if it is determined that the second configuration is at least threshold similar to the first configuration.

Another embodiment of the present disclosure provides a first wireless communication device. The device includes a wireless communication interface for engaging in wireless communication with a wireless communication network. The device also includes a processor and data storage. Further, the device includes program logic stored in the data storage and executable by the processor to carry out functions including those of the just-described method. Yet another embodiment of the present disclosure provides a non-transitory computer-readable medium having stored thereon program instructions executable by a processing unit to cause a first WCD to carry out functions including those of the just-described method.

These and other aspects will become apparent to those of ordinary skill in the art by reading the following detailed description, with reference where appropriate to the accompanying drawings. Further, it should be understood that the embodiments noted herein are not intended to limit the scope of the claims.

DETAILED DESCRIPTION

The present method and corresponding device will now be described with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

1. EXEMPLARY ARCHITECTURE a. Exemplary Wireless Communication Network

Figure 1:
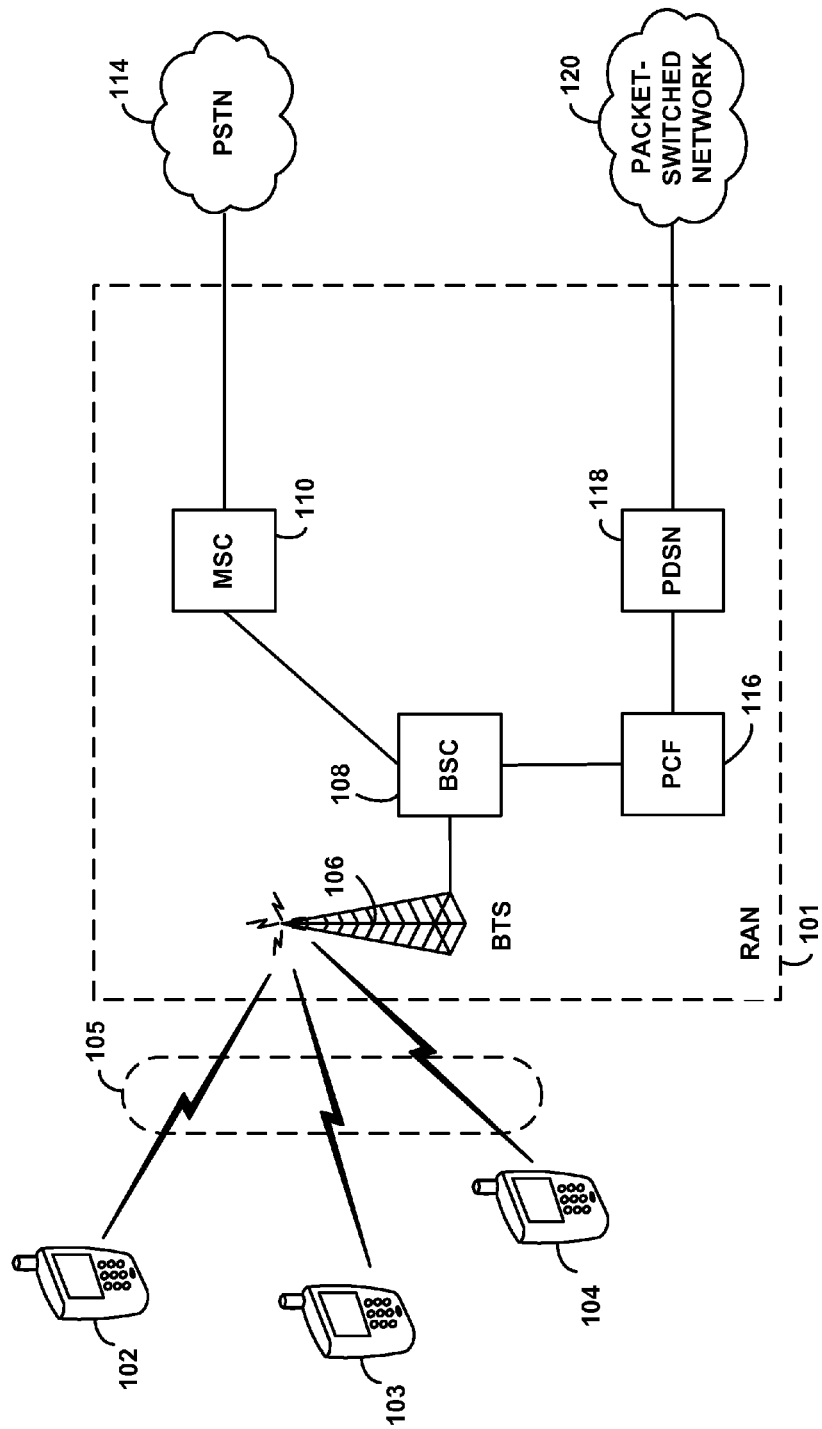
FIG. 1 is a simplified block diagram of an example wireless communication network in which at least one embodiment can be carried out.

FIG. 1 depicts a wireless communication system that includes RAN 101 communicatively connected via separate communication paths with both PSTN 114 and packet-switched network 120. FIG. 1 also depicts RAN 101 in additional detail. In particular, RAN 101 is shown as serving example WCDs 102-104 communicating over air interface 105 with BTS 106. It should be understood, however, that the RAN 101 could just as well take a variety of other forms, the specific details of which are not critical to an understanding of the present disclosure.

In at least one embodiment, BTS 106 is connected to and controlled by BSC 108, which in turn is connected to mobile switching center (MSC) 110, which among other functions provides connectivity and access to a circuit-switched transport network such as PSTN 114 to provide services such as voice calls. As shown, BSC 108 is also connected (by way of packet control function (PCF) 116) with packet data serving node (PDSN) 118, which provides connectivity and access to packet-switched network 120, which may be the Internet.

With the example arrangement shown, BTS 106 would typically include one or more antennas, power amplifiers, and associated equipment, cooperatively enabling BTS 106 to radiate in a manner that defines one or more wireless coverage areas such as sectors for instance. In practice, BTS 106 may be configured to provide service to each such coverage area. The air-interface communication between BTS 106 and WCDs 102-104 may comply with any suitable air-interface protocol, examples of which include CDMA (e.g., 1xRTT or EV-DO), LTE, WiMAX, IDEN, GSM, HSDPA, WIFI, BLUETOOTH, or other protocols now known or later developed.

When RAN 101 seeks to connect a call or other communication to an idle WCD, BTS 106 may transmit a page message to the WCD in the coverage area in which the WCD last registered. Upon detecting such a page message, the WCD may then respond to BTS 106, and BTS 106 may assign an air-interface traffic channel to the WCD, thereby transitioning the device to an "active" state. Likewise, when the WCD seeks to initiate a call or other communication, the WCD and BTS 106 may engage in signaling and BTS 106 may assign an air-interface traffic channel to the WCD, thereby transitioning the WCD to the active state. Further, after a period of inactivity on the assigned air-interface traffic channel, the traffic channel may be released, thereby transitioning the WCD back to the idle (e.g., dormant) state.

In practice, whether the WCD is idle or active, the WCD may regularly measure the air-interface quality of the wireless communication network. If the WCD detects a pilot signal from another coverage area that is sufficiently stronger than that in its current serving coverage area, the WCD may then engage in a handoff to the other coverage area. In idle mode, the WCD may simply register with RAN 101 to notify RAN 101 that the WCD is now operating in the other coverage area. In active mode, on the other hand, the WCD may engage in more substantial signaling with RAN 101 to facilitate handoff of the WCD's active communication session from its currently serving coverage area to the other coverage area.

b. Exemplary Wireless Communication Device

Figure 2:
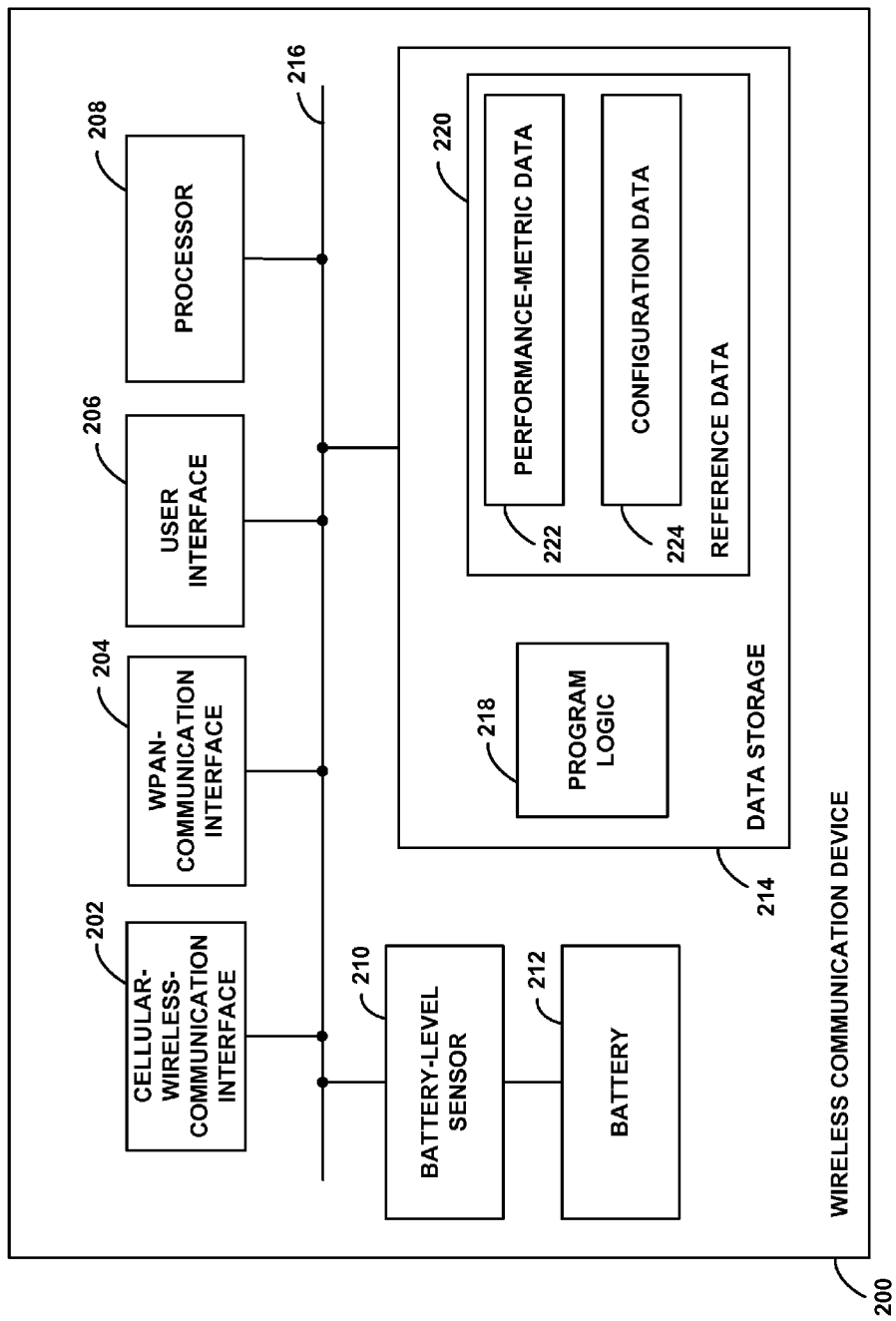
FIG. 2 is a simplified block diagram of an example wireless communication device in accordance with at least one embodiment.

Those skilled in the art will appreciate that there can be numerous specific implementations of a WCD that may be used in connection with at least one embodiment of the method described herein. By way of example, FIG. 2 is a simplified block diagram of a WCD 200, showing functional components that can be included in such a device to facilitate implementation of at least one embodiment. As shown, the example device includes a cellular-wireless-communication interface 202, a wireless personal area network (WPAN) communication interface 204, a user interface 206, a processor 208, a battery-level sensor 210, a battery 212, and data storage 214, all of which may be coupled together by a system bus, network, or other connection mechanism 216.

Cellular-wireless-communication interface 202 may be or include any combination of software and/or hardware modules that WCD 200 uses to communicate in a wireless manner with one or more other entities. As such, cellular-wireless-communication interface 202 may have one or more chipsets suitable for wireless communication, and/or one or more other components suitable for engaging in data communication. For instance, cellular-wireless-communication interface 202 may operate in compliance with one of the air-interface protocols noted above.

WPAN-communication interface 204 enables WCD 200 to transfer data to and/or receive data from one or more other devices via a direct wireless link. Some exemplary embodiments of the WPAN-communication interface utilized for communicating via direct wireless links include Bluetooth, Infrared Wireless, Ultra Wideband and Induction Wireless links. Other WPAN-communication interfaces are possible as well.

User interface 206 comprises one or more input and/or output components to facilitate interaction with a user of the device as appropriate (if the device is one with which one or more users interact). As such, the user interface may include input components such as a keypad, touchpad, touch-sensitive display, microphone, and camera, and the user interface may further include output components such as a display screen and a sound speaker or headset jack. Other input and output components are possible as well.

Processor 208 comprises one or more general purpose processors (e.g., INTEL microprocessors) and/or one or more special purpose processors (e.g., digital signal processors, application specific integrated circuits, etc.) and may be integrated in whole or in part with cellular-wireless-communication interface 202 and/or other components of the WCD. Processor 208 may include logic modules that periodically collect performance-metric data from the software and/or hardware modules located on the WCD as discussed in connection with FIG. 2 below.

Battery-level sensor 210 functions to regularly monitor the remaining power of the battery 212 and to provide an output signal indicating the current remaining battery power. Battery-level sensor 210 may be integrated in the battery itself or could be provided in some other form.

Battery 212 provides power to support operation of the WCD when the WCD is not connected with another power source. Battery 212 may be rechargeable and may take various forms, examples of which include nickel metal hydride (NiMH), nickel cadmium (NiCd), Lithium Ion (Li-Ion), and lithium polymer (Li-Poly), or any other form now known or later developed.

Data storage 214 may include one or more volatile and/or non-volatile storage components, such as optical, magnetic, flash, or organic storage components, and may be integrated in whole or in part with the processor 208. Data storage 214 may include any type of non-transitory computer-readable medium or media, such as a storage device that includes a disk and/or a hard drive, as examples. The computer-readable medium may include media arranged to store data for short periods of time, such as register memory, processor cache, and/or random access memory (RAM), as examples. The computer-readable medium may also or instead include media arranged to serve as secondary or more persistent long-term storage, such as read only memory (ROM), optical disks, magnetic disks, and/or compact-disc ROM (CD-ROM), as examples. The computer-readable media may also or instead include any other volatile and/or non-volatile storage system or systems deemed suitable for a given implementation. As shown, representative data storage 214 includes program logic 218 and reference data 220.

Program logic 218 may be executable by processor 208 to carry out various WCD functions described herein. Reference data 220 may comprise data such as performance-metric data 222 and configuration data 224.

Performance-metric data 222 related to the wireless communication network may reflect metrics such as air-interface quality, signal strength, error rate, signal-to-noise ratio, extent of dropped or blocked calls, and so forth. Further, performance-metric data 222 may include battery-power-level information, which may comprise an indication of currently remaining power in battery 212 as determined through regular monitoring by battery-level sensor 210 for instance. Other example types of performance-metric data 222 are possible as well.

Configuration data 224 may comprise a list of software and/or hardware modules that are located on the WCD. Software modules may include applications downloaded by the user, as well as applications that are pre-installed on the WCD, among other examples. Hardware modules may include features such as a camera, global positioning system (GPS) receiver, the cellular-wireless-communication interface 202, and the WPAN-communication interface 204. Other example hardware modules are possible as well.

These various elements may be integrated together, distributed, or modified in various ways, and the WCD may have more or fewer elements than these. The WCD described above is representative of either a first WCD or a second WCD of the claimed method, as discussed below in relation to FIG. 3.

2. EXEMPLARY OPERATION

Figure 3:
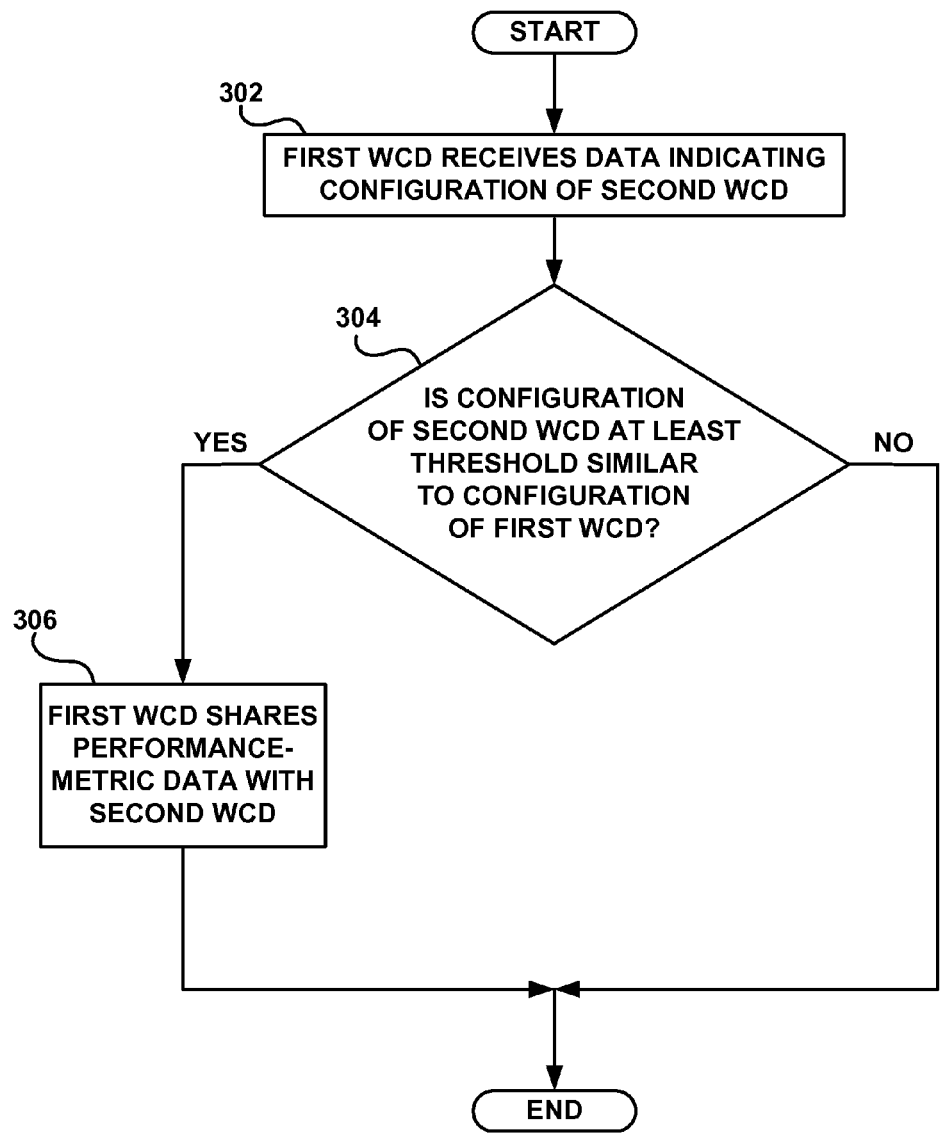
FIG. 3 is a flowchart depicting functions that can be carried out in accordance with at least one embodiment.

FIG. 3 is a flowchart depicting functions that may be carried out in accordance with at least one embodiment. Furthermore, although the blocks are shown in a sequential order, the functions represented by these blocks could instead be carried out in parallel and/or in a different order than that described herein, unless context clearly dictates otherwise, such as clearly indicating a sequential dependency, as one example. Also, the various blocks may be combined into fewer blocks, divided into additional blocks, and/or removed based upon the specifics of a given implementation.

In particular, FIG. 3 is a flowchart of a method that may be carried out by a first WCD that has a first configuration. At block 302, the method begins with the first WCD receiving data from a second WCD. The data received by the first WCD indicates a configuration of the second WCD. The first WCD receives this data via a direct wireless link between the first WCD and the second WCD. In at least one embodiment, the direct wireless link is a WPAN.

In at least one embodiment, the second WCD sends the data indicating its configuration to the first WCD when the first WCD is within the range of the WPAN of the second WCD. For example, a Bluetooth WPAN typically has a range of approximately 30 feet. Therefore, in this example, when the first WCD comes within 30 feet of the second WCD, the second WCD shares the data indicating its configuration with the first WCD. Other embodiments are possible.

In at least one embodiment, the data indicating the configuration of the second WCD includes a list of one, some, or all of the software modules that are installed on the second WCD. In at least one embodiment, the data indicating the configuration of the second WCD includes a list of some, one, or all of the hardware modules that are located on the second WCD. In at least one embodiment, the data indicating the configuration of the second WCD includes a partial or exhaustive list of both software and hardware modules of the second WCD. In at least one embodiment, the second WCD periodically generates the lists of software and/or hardware modules and stores the lists in the configuration data of the second WCD. Other embodiments are possible as well.

The method continues with the first WCD comparing the configuration of the first WCD with the configuration of the second WCD. In at least one embodiment, the first WCD compares the software modules of the first WCD with the software modules of the second WCD. In at least one embodiment, the first WCD compares the hardware modules of the first WCD with the hardware modules of the second WCD. In at least one embodiment, the first WCD compares a combination of both the software and hardware modules of the first WCD with the software and hardware modules of the second WCD.

As discussed above, in at least one embodiment, the first WCD compares the configuration of the first WCD with the configuration of the second WCD. In such an embodiment, the first WCD may compile a list of software and/or hardware modules located on the second WCD based on the configuration data of the second WCD. The first WCD may periodically generate a list of the software and/or hardware modules located on the first WCD. The first WCD may then compare the list of software and/or hardware modules located on the second WCD with the list of software and/or hardware modules located on the first WCD. The first WCD may then determine if any software and/or hardware modules are located on both the first and second WCDs. Other embodiments are possible as well.

After comparing the configuration of the first WCD with the configuration of the second WCD, the method continues at block 304 with the first WCD determining whether the configuration of the second WCD is at least threshold similar to the configuration of the first WCD. In at least one embodiment, the first WCD decides that the second configuration is at least threshold similar to the first configuration when the first and second WCDs share at least one software module. In at least one embodiment, the first WCD decides that the second configuration is at least threshold similar to the first configuration when the first and second WCDs share at least one hardware module. In at least one embodiment, the first WCD decides that the second configuration is at least threshold similar to the first configuration when the first and second WCDs share a set percentage of software and/or hardware modules. Other embodiments of threshold similarity are possible.

In at least one embodiment, a user of the first WCD sets the minimum level of threshold similarity required for the first WCD to share performance-metric data with the second WCD. The user may define a similarity threshold through a user interface. Similar to the embodiments described above, in at least one embodiment, the user, through a user interface of the first WCD, decides that the first WCD will determine that the second configuration is at least threshold similar to the first configuration when the first and second WCDs share at least one software module. In at least one embodiment, the user, through the user interface of the first WCD, decides that the first WCD will determine that the second configuration is at least threshold similar to the first configuration when the first and second WCDs share at least one hardware module. In at least one embodiment, the user, through the user interface of the first WCD, decides that the second configuration is at least threshold similar to the first configuration when the first and second WCDs share a set percentage of software and/or hardware modules. As one example, the user, through the user interface of the first WCD, may decide that the second configuration is at least threshold similar to the first configuration when at least 50% of the software and/or hardware modules located on the second WCD are also located on the first WCD. Other embodiments are possible as well.

In another embodiment, the minimum level of threshold similarity is programmed into the hardware of the first WCD. In such an embodiment, the user may not be able to change the minimum level of threshold similarity. Similar to the embodiments described above, in at least one embodiment, the first WCD is programmed to decide that the second configuration is at least threshold similar to the first configuration when the first and second WCDs share at least one software module. In at least one embodiment, the first WCD is programmed to decide that the second configuration is at least threshold similar to the first configuration when the first and second WCDs share at least one hardware module. In at least one embodiment, the first WCD is programmed to decide that the second configuration is at least threshold similar to the first configuration when the first and second WCDs share a set percentage of software and/or hardware modules. Other embodiments are possible as well.

If the first WCD decides that the configuration of the second WCD is at least threshold similar to the configuration of the first WCD, the method continues at block 306 with the first WCD sharing performance-metric data with the second WCD. The first WCD shares the performance-metric data via the direct wireless link between the first WCD and the second WCD, as discussed above. The first WCD may share the performance-metric data that is relevant to the software and/or hardware modules that are located on both the first and second WCDs.

In at least one embodiment, the software and hardware modules of the first WCD periodically collect performance-metric data indicating the performance of that particular hardware or software module. In at least one embodiment, a logic module in the processor of the first WCD collects the performance-metric data from the software and/or hardware modules. The logic module of the first WCD then shares the performance-metric data of the matching software and/or hardware modules with the second WCD in the event that the first WCD determines that the second configuration is at least threshold similar to the first configuration. In at least one embodiment, the software and/or hardware modules are arranged to report the performance-metric data to the logic module at regular intervals. In at least one embodiment, the logic module requests the performance-metric data from the software and/or hardware modules. Other embodiments are possible as well.

In at least one embodiment, the performance-metric data comprises a measure of air-interface quality of the wireless communication network. In at least one embodiment, a software and/or hardware module may record the rate at which the module communicates with the wireless communication network. In at least one embodiment, the software and/or hardware module may record whether the WCD receives any error messages from the module. In at least one embodiment, the software and/or hardware module may record signal strength, signal-to-noise ratio, and/or extent of dropped or blocked calls.

In at least one embodiment, the air-interface quality of the wireless communication network is measured with respect to the location of the WCD. In such an embodiment, the WCD may store a table of data listing the location of the WCD and the performance-metric data corresponding to that location. For example, the wireless communication network may have problems with network connectivity in certain locations, and the first WCD may inform the second WCD of those issues when the second WCD enters such a location. In at least one embodiment, the location of the WCD is the cell and/or sector in which the first WCD is located. In such an embodiment, the air-interface quality of the wireless communication network may be measured with respect to the coverage area in which the first WCD is located. In at least one embodiment, the location of the first WCD is a smaller subset of the cell and/or sector in which the first WCD is located. In such an embodiment, the air-interface quality of the wireless communication network may be measured with respect to a geographic location in which the first WCD is located. In one example, the geographic location can be an area the size of a city block. In another example, the geographic location can be a particular building (e.g., a train station or a stadium). Other embodiments are possible as well.

In at least one embodiment, the air-interface quality of the wireless communication network is measured with respect to time of day. In such an embodiment, the WCD may store a table of data listing the time of day and the performance-metric data corresponding to that time of day. In at least one embodiment, the air-interface quality of the wireless communication network may be measured with respect to both the location of the WCD and the time of day. In such an embodiment, the WCD stores a table of data listing the location of the WCD as well as the time of day and the performance-metric data corresponding to that location and time of day. For example, a WCD in a train station in a large city at rush hour may experience very poor air-interface quality. The first WCD may inform the second WCD of such issues when the second WCD enters such a location at such a time.

In at least one embodiment, the performance-metric data comprises the rate of battery drain of the WCD. A battery-level sensor may regularly provide an indication of the level of power remaining in the battery of the WCD, such as a measure of power or a percentage of remaining power for instance. Additionally, the battery-level sensor may provide an average rate of battery drain for a particular software and/or hardware module. The first WCD can then inform the second WCD if certain software and/or hardware modules are causing the battery of the first WCD to drain at a higher rate than normal.

In at least one embodiment, the shared performance-metric data of a software module may be defined by a software developer. For example, a software developer may specify that for a particular software module, the first WCD only shares the rate of battery drain with the second WCD. In at least one embodiment, the shared performance-metric data of a hardware module may be defined by the hardware of the first WCD. For example, a hardware module of the WCD may be programmed to only share performance-metric data relating to air-interface quality of the wireless communication network. In at least one embodiment, the shared performance-metric data may be defined by a user through the user interface of the first WCD. In such an embodiment, the user may customize the types of performance-metric data shared between WCDs. In one example, the user may share air-interface quality metrics for a first software module, but only share battery-drain information for a second software module. Other embodiments are possible as well.

In at least one embodiment, the second WCD receives performance-metric data from the first WCD. The second WCD may then adjust its configuration in response to the shared performance-metric data to avoid problems and enhance user experience. In at least one embodiment, the second WCD may adjust the rate of communication with the wireless communication network in response to receiving the shared performance-metric data. For example, if the first WCD experiences problems connecting to the wireless communication network, the second WCD may decrease the rate of communication with the wireless communication network to avoid unnecessary battery drain. In at least one embodiment, the second WCD may deactivate a software and/or hardware module that experiences trouble connecting to the wireless communication network. In at least one embodiment, the second WCD may disconnect from a wireless communication network with which the first WCD experiences poor connection quality. In at least one embodiment, the second WCD may connect to a wireless communication network with which the first WCD experiences good connection quality. In other words, the second WCD may choose to connect to a particular wireless communication network based on the shared performance-metric data from the first WCD.

Functions of the present method can be encoded in a set of program instructions stored on a non-transitory machine readable medium, such as magnetic, optical, or other data storage for instance, to be executed by a processor. In addition or alternatively, the functions can be specifically carried out by one or more devices or servers as discussed above.

3. CONCLUSION

While exemplary embodiments have been described, persons of skill in the art will appreciate that variations may be made without departure from the scope and spirit of the invention. This true scope and spirit is defined by the appended claims, which may be interpreted in light of the foregoing.

We claim:

1. A method carried out by a first wireless communication device (WCD), the first WCD having a first configuration including a plurality of modules, the method comprising:
   receiving into the first WCD from a second WCD, via a direct wireless link between the first WCD and the second WCD, data indicating a second configuration of the second WCD;
   based on the data indicating the second configuration, the first WCD making a determination as to whether the second configuration is at least threshold similar to the first configuration, wherein making the determination that the second configuration is at least threshold similar to the first configuration comprises determining that the second configuration includes at least one of the plurality of modules of the first configuration;
   responsive to the determination being that the second configuration is at least threshold similar to the first configuration, the first WCD sharing with the second WCD, via the direct wireless link, performance-metric data for a wireless communication network; and
   the second WCD receiving the performance-metric data for the wireless communication network from the first WCD.

2. The method of claim 1, wherein the direct wireless link comprises a Bluetooth link.

3. The method of claim 1, further comprising receiving into the first WCD user input defining a similarity threshold, wherein making the determination as to whether the second configuration is at least threshold similar to the first configuration comprises determining a measure of similarity between the first configuration and the second configuration and further determining whether the measure of similarity meets the similarity threshold.

4. The method of claim 1, wherein the performance-metric data comprises a measure of air-interface quality of the wireless communication network.

5. The method of claim 1, further comprising the first WCD recording data indicating performance of the wireless communication network on a per-location basis, wherein the first WCD and the second WCD are both located at a current location, and wherein sharing the performance-metric data comprises the first WCD sending to the second WCD, via the direct wireless link, data indicating performance of the wireless communication network for the current location.

6. The method of claim 1, further comprising the first WCD recording data indicating performance of the wireless communication network based on time of day, wherein sharing the performance-metric data comprises sending to the second WCD, via the direct wireless link, data indicating performance of the wireless communication network for a current time.

7. The method of claim 1, wherein the second WCD communicates with the wireless communication network at a rate of communication, the method further comprising the second WCD adjusting the rate of communication in response to receiving the shared performance-metric data from the first WCD.

8. The method of claim 1, wherein the second configuration includes a first module, the method further comprising the second WCD deactivating the first module in response to receiving the shared performance-metric data from the first WCD.

9. The method of claim 1, further comprising the second WCD disconnecting from the wireless communication network in response to receiving the shared performance-metric data from the first WCD.

10. A first wireless communication device (WCD) having a first configuration including a plurality of modules, wherein the first WCD comprises:
    a wireless communication interface for engaging in wireless communication with a wireless communication network;
    a processor;
    data storage; and
    program logic stored in the data storage and executable by the processor to carry out functions comprising:
       receiving into the first WCD from a second WCD, via a direct wireless link between the first WCD and the second WCD, data indicating a second configuration of the second WCD;
       based on the data indicating the second configuration, the first WCD making a determination as to whether the second configuration is at least threshold similar to the first configuration, wherein making the determination that the second configuration is at least threshold similar to the first configuration comprises determining that the second configuration includes at least one of the plurality of modules of the first configuration;
       responsive to the determination being that the second configuration is at least threshold similar to the first configuration, the first WCD sharing with the second WCD, via the direct wireless link, performance-metric data for a wireless communication network; and
       the second WCD receiving the performance-metric data for the wireless communication network from the first WCD.

11. The device of claim 10, wherein the program logic is further executable by the processor to carry out the function of receiving into the first WCD user input defining a similarity threshold, wherein making the determination as to whether the second configuration is at least threshold similar to the first configuration comprises determining a measure of similarity between the first configuration and the second configuration and further determining whether the measure of similarity meets the similarity threshold.

12. The device of claim 10, wherein the program logic is further executable by the processor to carry out the function of recording data indicating performance of the wireless communication network on a per-location basis, wherein the first WCD and the second WCD are both located at a current location, and wherein sharing the performance-metric data comprises the first WCD sending to the second WCD, via the direct wireless link, data indicating performance of the wireless communication network for the current location.

13. The device of claim 10, wherein the program logic is further executable by the processor to carry out the function of recording data indicating performance of the wireless communication network based on time of day, wherein sharing the performance-metric data comprises sending to the second WCD, via the direct wireless link, data indicating performance of the wireless communication network for a current time.

14. A non-transitory computer-readable medium having stored thereon program instructions executable by a processor to cause a first wireless communication device (WCD) to carry out functions, the first WCD having a first configuration including a plurality of modules, the functions comprising:

receiving into the first WCD from a second WCD, via a direct wireless link between the first WCD and the second WCD, data indicating a second configuration of the second WCD;

based on the data indicating the second configuration, the first WCD making a determination as to whether the second configuration is at least threshold similar to the first configuration, wherein making the determination that the second configuration is at least threshold similar to the first configuration comprises determining that the second configuration includes at least one of the plurality of modules of the first configuration;

responsive to the determination being that the second configuration is at least threshold similar to the first configuration, the first WCD sharing with the second WCD, via the direct wireless link, performance-metric data for a wireless communication network; and the second WCD receiving the performance-metric data for the wireless communication network from the first WCD.

15. The non-transitory computer-readable medium of claim 14, wherein the functions further comprise receiving into the first WCD user input defining a similarity threshold, wherein making the determination as to whether the second configuration is at least threshold similar to the first configuration comprises determining a measure of similarity between the first configuration and the second configuration and further determining whether the measure of similarity meets the similarity threshold.

16. The non-transitory computer-readable medium of claim 14, wherein the functions further comprise recording data indicating performance of the wireless communication network on a per-location basis, wherein the first WCD and the second WCD are both located at a current location, and wherein sharing the performance-metric data comprises the first WCD sending to the second WCD, via the direct wireless link, data indicating performance of the wireless communication network for the current location.

17. The non-transitory computer-readable medium of claim 14, wherein the functions further comprise recording data indicating performance of the wireless communication network based on time of day, wherein sharing the performance-metric data comprises sending to the second WCD, via the direct wireless link, data indicating performance of the wireless communication network for a current time.

* * * * *